(12) United States Patent
Keshmiri et al.

(10) Patent No.: US 12,230,154 B2
(45) Date of Patent: Feb. 18, 2025

(54) GUIDING AN UNMANNED AERIAL VEHICLE USING MULTI-POINT GUIDANCE

(71) Applicant: University of Kansas, Lawrence, KS (US)

(72) Inventors: Shawn Keshmiri, Lawrence, KS (US); Jeffrey Xu, Lawrence, KS (US); Thomas Brendan Le Pichon, Kansas City, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 17/626,050

(22) PCT Filed: Jul. 10, 2020

(86) PCT No.: PCT/US2020/041652
§ 371 (c)(1),
(2) Date: Jan. 10, 2022

(87) PCT Pub. No.: WO2021/050161
PCT Pub. Date: Mar. 18, 2021

(65) Prior Publication Data
US 2024/0046803 A1    Feb. 8, 2024

Related U.S. Application Data

(60) Provisional application No. 62/872,684, filed on Jul. 10, 2019.

(51) Int. Cl.
*G08G 5/00*    (2006.01)
*G05D 1/00*    (2024.01)

(52) U.S. Cl.
CPC .......... *G08G 5/0069* (2013.01); *G05D 1/101* (2013.01); *G08G 5/0021* (2013.01); *G08G 5/0039* (2013.01)

(58) Field of Classification Search
None
See application file for complete search history.

(56) References Cited

U.S. PATENT DOCUMENTS

| | | | |
|---|---|---|---|
| 7,228,227 B2* | 6/2007 | Speer | G05D 1/101 |
| | | | 342/357.53 |
| 2006/0015247 A1* | 1/2006 | Speer | G01C 23/005 |
| | | | 701/3 |

(Continued)

FOREIGN PATENT DOCUMENTS

| | | |
|---|---|---|
| CA | 3051611 | 5/2021 |
| WO | WO 2014/063537 | 5/2014 |

OTHER PUBLICATIONS

PCT/US2020/041652, May 18, 2021, International Search Report and Written Opinion.

*Primary Examiner* — Daniel L Greene
(74) *Attorney, Agent, or Firm* — RAY QUINNEY & NEBEKER P.C.; Paul N. Taylor

(57) ABSTRACT

The present disclosure relates to systems, methods, and computer readable media implemented in connection with an unmanned aerial vehicle (UAV) to navigate a UAV along a desired path. For example, systems disclosed herein identify an anticipatory flight path and identify a plurality of reference points on the flight path relative to a current position of the UAV. The systems described herein may further determine reference angles between a current trajectory of the UAV and the reference points to determine an updated trajectory that the UAV should take to stay close to the identified flight path. The systems described herein may further cause the UAV to accelerate in a lateral direction based on the updated trajectory. The features and functionality of systems disclosed herein enable the UAV to accurately follow a complex path having sharp turns with little or no advanced knowledge of the flight path prior to departure.

20 Claims, 7 Drawing Sheets

(56) References Cited

U.S. PATENT DOCUMENTS

| | | |
|---|---|---|
| 2007/0233338 A1 | 10/2007 | Ariyur et al. |
| 2008/0039984 A1 | 2/2008 | Bitar et al. |
| 2008/0154490 A1* | 6/2008 | Hoofd ................. G08G 5/0039 |
| | | 701/533 |
| 2009/0005967 A1* | 1/2009 | Rumbo ................ G08G 5/0034 |
| | | 701/410 |
| 2009/0118896 A1 | 5/2009 | Gustafsson |
| 2013/0289818 A1 | 10/2013 | Appleman et al. |
| 2018/0068569 A1 | 3/2018 | Chmelarova et al. |
| 2019/0104250 A1* | 4/2019 | Sheftel ................. G05D 1/104 |

\* cited by examiner

GUIDING AN UNMANNED AERIAL VEHICLE USING MULTI-POINT GUIDANCE

CROSS-REFERENCE TO RELATED APPLICATIONS

This application is a U.S. Nationalization of PCT Application Number PCT/US2020/041652, filed on Jul. 10, 2020, titled, "GUIDING AN UNMANNED AERIAL VEHICLE USING MULTI-POINT GUIDANCE", which claims the benefit of U.S. Provisional Patent Application Ser. No. 62/872,684, filed Jul. 10, 2019, titled "Multi-Eye Guidance Method for UAVs Path Following," which are hereby incorporated by reference in their entireties.

GOVERNMENTAL RIGHTS

This invention was made with government support under NNX15AN04A and 80NSSC18P1909 awarded by the National Aeronautics and Space Administration. The government has certain rights in the invention.

BACKGROUND

Aerial vehicles are becoming increasingly common. Indeed, consumers, governments, and various enterprises have begun to utilize unmanned aerial vehicles (UAVs) to perform various tasks and operations. As an example, developers have created UAVs capable of traveling along defined predetermined or desired paths of movement. Indeed, as popularity of UAVs continues to increase, UAVs are increasingly used in more complex terrains, such as urban centers and other highly developed environments with buildings and other obstacles that present navigation challenges. Conventional systems for navigating flight paths of UAVs, however, suffer from a number of problems and drawbacks.

For example, conventional navigation are often incapable of following a flight path without having access to the flight path before departure. Indeed, where a flight path includes a complex path having multiple turns (e.g., sharp and/or narrow turns), many UAVs require involved programming and tuning of complex models to successfully navigate a predefined flight path. As a result, conventional navigation systems may involve a programmer or operator defining a unique routine or program for each turn (or suboptimal routines for different turns), thus overcomplicating the system with an overbearing amount of tuning to reach a desirable flight path. These overly complex navigation systems often result in significant development cost with high probability of error.

While some conventional systems are capable of navigating on the fly (e.g., as an alternative to more complex navigation systems), these simplified navigation systems are often incapable of navigating complex paths having sharp turns. For example, while many conventional navigations systems are well-equipped to follow curved paths and/or narrow turns (e.g., gradual turns), UAVs having conventional navigation systems thereon often overshoot or undershoot projected paths of movement, particularly where a desired path includes sharp corners or turns having acute angles (e.g., angles of equal or greater than ninety degrees). Significantly overshooting or undershooting turns on a path can cause accidents, particularly in constrained environments, such as urban areas that provide mobility.

Moreover, where UAVs (e.g., fixed-wing UAVs) often must maintain a specific air velocity, such as a minimum speed or stall speed that limits an ability to decelerate, an inability to execute sharp turns can cause significant problems, such as crashing into obstacles or stalling. Further, even where following a simple straight line, many conventional UAVs fail to respond to environmental disturbances (e.g., wind) without presenting large overshoots.

These and other problems exist with regard to navigating flight paths of UAVs.

BRIEF SUMMARY

One or more embodiments described herein relate to a UAV having a novel flight control system implemented thereon. For example, in one or more implementations, a system may identify a desired flight path between a current location of an unmanned aerial vehicle (UAV) (e.g., a fixed-wing UAV) and a destination. In one or more implementations, the system modifies a trajectory or flyable path of the UAV based on a difference between a current trajectory of the UAV and a composite trajectory based on locations of reference points relative to a current location of the UAV. Further, the system may cause the UAV to accelerate in a direction of the modified and flyable flight path.

Features and functionality of systems described herein minimize a difference between a path that the UAV is guided and a desirable flight path. Indeed, where the majority of conventional guidance logics are often suboptimal and cause significant deviations from a desired path (e.g., even when tracking straight lines), systems described herein provide a significant improvement over conventional systems at minimizing a difference between a guided path and desired path.

In one or more implementations, identifying the flight path includes receiving a transmission package including the flight path from a remote computing device. Alternatively, in one or more implementations, identifying the flight path includes adaptively determining the flight path based on the current location of the UAV and a target destination (e.g., the desired path). In one or more embodiments, the path of movement includes a sharp turn having an angle greater than or equal to ninety degrees. Further, in one or more embodiments, the path of movement includes two or more sharp turns having angles greater than or equal to ninety degrees.

In one or more implementations, identifying the plurality of reference points comprises identifying reference points at predetermined distances from adjacent reference points where the predetermined distances (e.g., receding horizon) is determined based on a velocity of the UAV. In one or more implementations, identifying the plurality of reference points includes identifying a range of three to twelve reference (or more) points along the desired path of movement of the UAV. Indeed, as discussed herein, a number of reference points may be determined based on a function of velocity, frequency, and reference point range.

In one or more embodiments, determining the modified and flyable flight path includes determining a plurality of reference angles between the current trajectory of the UAV and respective paths from the UAV to the plurality of reference points, for each reference point of the plurality of reference points, a reference angle between the current trajectory and a path from the UAV to the reference point. Determining the modified and flyable flight path may also include determining the composite trajectory based on a combination of reference angles for the plurality of reference points. In one or more embodiments, determining the composite trajectory is based on a weighted average of the plurality of reference angles where determining the weighted average includes applying a highest weight factor of a plurality of weight factors to a largest reference angle from the plurality of reference angles.

In one or more embodiments, causing the UAV to accelerate in the direction of the modified and flyable flight path includes initiating a side acceleration of the UAV based on a function of the difference between the current trajectory and the composite trajectory.

In one or more implementations, the system detects that the UAV is moving away from a first reference point of the plurality of reference points. Based on the UAV moving away from the first reference point, the system may update the plurality of reference points by replacing the first reference point with a new reference point on the flight path. In one or more implementations, the system determines an updated flight path based on the updated plurality of reference points. The system can further cause the UAV to accelerate in a direction of the updated flight path.

In one or more embodiments, the reference points may move with the UAV within an internal coordinate system of the UAV. For example, in one or more implementations, the reference points may be spaced apart based on a velocity of the UAV while accounting for wind (e.g., using the internal velocity tracked by the UAV) and other environmental factors.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. While some of the drawings may be schematic or exaggerated representations of concepts, at least some of the drawings may be drawn to scale. It will be understood that the drawings depict example implementations, which will be described and explained with additional specificity and detail through the use of the accompanying drawings in which.

DETAILED DESCRIPTION

Figure 1:
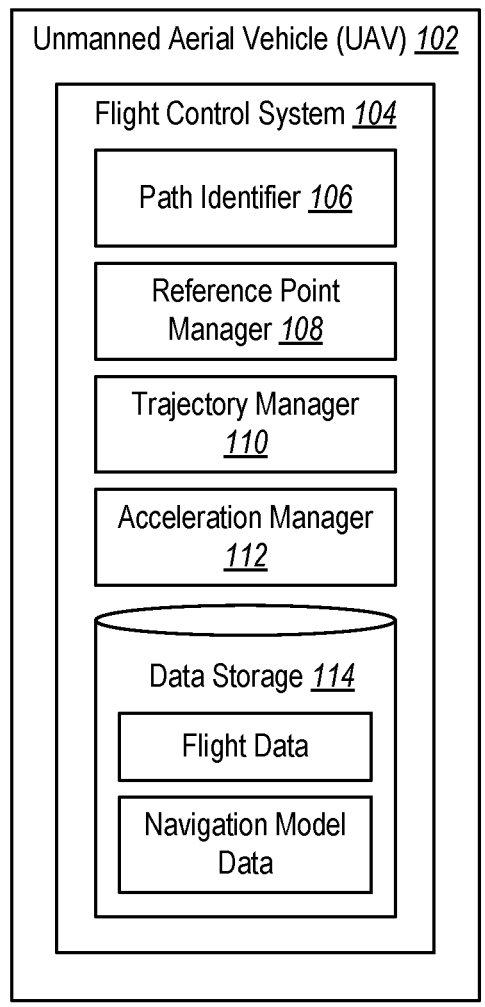
FIG. 1 illustrates an example block diagram of a UAV device having a flight control system implemented thereon in accordance with one or more embodiments described herein.

The present disclosure generally relates to systems, methods, and computer readable media implemented in connection with an unmanned aerial vehicle (UAV) and flight control systems that enable a UAV to follow along a desired path without experiencing many of the problems associated with conventional UAVs and conventional flight control systems. Indeed, by utilizing multiple reference points to guide movement of a UAV, a UAV may pre-emptively accelerate relative to a desired path of movement to accurately guide the UAV to move along a desired path of movement without requiring an extensive knowledge of the path beforehand. This enables a UAV to be autonomously guided along a complex path of movement including turns of various angles and sharpness.

The present disclosure includes a number of practical applications that provide benefits and/or solve problems associated with navigating a UAV along a desired path of movement. Examples of these applications and benefits are discussed in further detail below.

For example, where conventional systems often require an advanced knowledge of a flight path before departure (and even have difficulty optimizing turns across a range of turn angles), the flight control system described herein can modify a flight path of a UAV based on look-ahead reference points without advanced knowledge of the flight path. For instance, by identifying reference points along a flight path that are within a predetermined distance of the UAV, the flight control system can follow closely to a desired path without having a full knowledge of the entire path between an origin and destination. This ability to fly close to a desired path without preprogramming significantly reduces development costs as well as eliminates a requirement that the UAV be in constant communication with remote devices (e.g., ground control). These features additionally reduce the risk of accidents in urban areas.

In addition, by identifying reference points and determining a modified and flyable flight path based on a difference between a current trajectory and a composite trajectory, the flight control system can accurately follow a flight path without a delayed reaction to a sudden change in the flight path. Indeed, where conventional systems typically react to an observed change in direction and overshoot a desired flight path, the flight control system described herein may adaptively determine a modified and flyable flight path based on a relative position of the plurality of reference points to predict upcoming turns and accurately follow a desired path notwithstanding what would otherwise be an unexpected sharpness of the turn(s).

In addition to providing an accurate navigation of a flight path, the flight control system additionally provides a flexible mechanism for following flight paths having variable levels of complexity under a variety of flight conditions. For example, by identifying and updating a plurality of reference points in accordance with embodiments described herein, the flight control system can navigate one or multiple sharp turns through a complex flight environment. Further, the flight control system can sample the plurality of reference points at different rates (or using variable numbers of reference points) to accommodate a variety of velocities and/or turn angles of the UAV.

Moreover, in one or more embodiments, the flight control system can modify a flight path based on updated instructions received in-flight. For example, based on a new or updated destination and without receiving detailed instructions of a desired flight path, the flight control system can efficiently modify a flight path in accordance with one or more embodiments described herein. Indeed, even where a modified and flyable flight path includes a 180 degree angle turn, such as turning around and returning to an origin or an original departure point, the flight control system can adaptively modify a desired path of the UAV to arrive at a desired location.

As illustrated in the foregoing discussion, the present disclosure utilizes a variety of terms to describe features and advantages of the systems described herein. Additional detail will now be provided regarding the meaning of some example terms.

As used herein, an "unmanned aerial vehicle" or "UAV" may refer generally to an aircraft that can be piloted autonomously between an origin and a destination. A UAV may be piloted autonomously without detailed instructions or knowledge beforehand of a specific flight path or remotely controlled by an individual and/or control system. A UAV may be used for multiple purposes or applications (e.g., military, agriculture, surveillance, delivery, urban air travel, etc.) In one or more implementations, a UAV includes one or more onboard computers that control the flight of the UAV. In one or more implementations, the UAV is a multi-rotor vehicle that includes integrated electronics, portable power (e.g., a battery), a global positioning system (GPS) receiver, a camera, and various sensors and receivers. In one or more implementations described herein, a UAV includes a flight control system implemented thereon having programmed instructions for navigating a flight path of the UAV.

As used herein, a "flight path" refers to a desired flight path of the UAV over some distance. For example, a flight path may refer any portion of a path between two points (e.g., coordinates). In one or more embodiments described herein, a flight path refers to a portion of an idealized or desired path based on a current location of the UAV and another point along a desired path en route to a final destination of the UAV. The flight path may include any number of turns including sharp turns and/or shallow turns. As used herein, a "sharp turn" or "acute turn" may refer interchangeably to any change in direction (e.g., lateral change in direction) having an angle greater than or equal to 90 degrees (or approximately 90 degrees). Alternatively, a "shallow turn" may refer to any change in direction (e.g., a lateral change in direction) having an angle less than or equal to 90 degrees (or approximately 90 degrees).

As used herein, a "reference point" may refer to any point associated with a desired path of the UAV. For instance, a reference point may refer to any point over a horizon or a receding horizon. In one or more embodiments, a flight path is defined by lines connecting adjacent reference points (e.g., from a plurality of three or more reference points). For example, where a plurality of reference points includes three reference points, a flight path may be defined by a first line connecting a first and second reference point and a second line connecting a second and third reference point. Alternatively, the reference points may be independent of specific positions of the reference points and a plurality of reference points may simply refer to any number of reference points at locations along the desired path of the UAV. In one or more embodiments, a reference point simply refers to any look-ahead point relative to a current position of the UAV.

Additional detail will now be provided regarding a flight control system implemented on a UAV in accordance with one or more embodiments. For example, FIG. 1 illustrates an example UAV 102 including a flight control system 104 implemented thereon. As shown in FIG. 1, the flight control system 104 may include a path identifier 106, a reference point manager 108, a trajectory manager 110, and an acceleration manager 112. As further shown, the flight control system 104 can include a data storage 114 having flight data and navigation model data stored thereon.

Each of the components 106-114 of the flight control system 104 can be implemented using a computing device including at least one processor executing instructions that cause the flight control system 104 and/or UAV 102 to perform one or more acts described herein. In one or more embodiments, the components 106-114 can comprise hardware, such as a special-purpose processing device to perform certain functions. Additionally, or alternatively, the components 106-114 can include a combination of computer-executable instructions and hardware. For example, in one or more embodiments, the flight control system 104 may include one or more computing devices, such as a computing device having features described below in connection with FIG. 6. In one or more embodiments, the flight control system 104 is a native application installed on the UAV 102. In one or more implementations, the flight control system 104 can be remotely accessible over a wireless network.

In addition, while one or more embodiments described herein refer to a flight control system 104 implemented entirely on a computing device of a UAV 102, one or more components of the flight control system 104 may be implemented on one or additional computing devices. For instance, in one or more embodiments, one or more components 106-114 of the flight control system 104 may be implemented in whole or in part on a ground control station or remote computing device in wireless communication with the UAV 102.

As mentioned above, and as shown in FIG. 1, the flight control system 104 can include a path identifier 106. The path identifier 106 can perform features related to identifying a flight path between a current location of the UAV 102 and an intended destination of the UAV 102. In one or more embodiments, the path identifier 106 receives information about the flight path from a remote computing device. Alternatively, in one or more embodiments, the path identifier 106 adaptively identifies the flight path as the UAV 102 is in-flight and moving toward an intended destination.

For example, in one or more implementations, the path identifier 106 may identify points along a desired path of movement of the UAV 102 based on an origin, a destination, and data that is gathered or otherwise collected by the UAV 102. For example, in one or more embodiments, the path identifier 106 employs sensors or a camera to scan an upcoming path to determine whether a desired path of the UAV 102 should continue in a straight line and/or modify direction (e.g., turn) from a current path. As will be discussed below, this may involve identifying reference points along the path of movement between a current and target destination of the UAV 102.

In one or more embodiments, the path identifier 106 identifies a desired path based on a locally stored map or other information that provides some additional measure of environmental awareness of the UAV 102. For example, in one or more embodiments, the flight control system 104 may store flight data including a map of a specific environment. The path identifier 106 may identify a desired path based on a received location or coordinate based on the map and an identified destination on the map. In one or more embodiments, the path identifier 106 receives or identifies additional environment data including flight conditions or other potential obstacles that may merit choosing a particular path over another in between a current position (or origin) of the UAV 102 and a target destination.

As will be discussed in further detail below, the flight path may include turns and angles of movement having any level of complexity. For example, in one or more embodiments, the flight path includes one or multiple sharp turns of various angles. In addition, or as an alternative, the flight path may include shallow angles or non-sharp changes in direction between two adjacent portions of the flight path.

Moreover, in one or more embodiments, the path identifier 106 may adaptively change or update a flight path based on any received information. For example, based on observed flight conditions, updated map information, or a modification to a target destination, the path identifier 106 may identify a new or modified and flyable flight path mid-flight. In one or more embodiments, the path identifier 106 performs an act of modifying the flight path locally. Alternatively, the path identifier 106 may receive a modified and flyable flight path from a remote computing device.

As further shown, the flight control system 104 includes a reference point manager 108. As will be discussed in further detail below, the reference point manager 108 can identify a plurality of reference points on the identified flight path. It will be appreciated that the reference point manager 108 can identify any number of reference points on the flight path. For example, the reference point manager 108 can identify anywhere between three reference points to one hundred reference points on the flight path (e.g., depending on complexity of the desired path). In one or more implementations, the reference point manager 108 identifies a number of reference points between three and twelve points (or more). In one or more implementations, the reference point manager 108 identifies a specific number of reference points based on a velocity of the UAV 102 and/or estimated angles of turns on the flight path. In one or more implementations, the reference point manager 108 identifies a number of reference points based on specific flight parameters of the UAV 102 and/or processing capabilities of the flight control system 104.

In one or more embodiments, the reference point manager 108 identifies reference points at predetermined distances from adjacent reference points on the flight path. For instance, the reference point manager 108 may identifier reference points at fixed distances from one another on the identified flight path. In one or more implementations, the reference point manager 108 identifies references points that are separated from one another on the flight path based on a speed and/or trajectory of the UAV 102. For instance, the reference point manager 108 may identifier reference points having greater distances from adjacent reference points where the UAV 102 is flighting at a higher velocity. Alternatively, the reference point manager 108 may identify reference points that are closer to adjacent reference points (e.g., having lower distances between adjacent points) where the UAV 102 is flying at a lower velocity (or some minimum velocity to maintain flight or altitude).

As will be discussed in further detail herein, the reference point manager 108 can periodically update reference points any number of times as the UAV moves. In particular, as will be discussed in further detail below, the reference point manager 108 may identify a plurality of reference points including waypoints that the UAV 102 is moving towards. As the UAV 102 moves and passes a reference point (or begins to move away from the reference point), the reference point may refer to a departure point, which the flight control system 104 may stop considering in determining a trajectory of the UAV 102. Additional detail in connection with updating reference points will be discussed below in connection with illustrative examples shown in FIGS. 2A-3C.

As will be discussed in further detail below, the plurality of reference points may include a number of waypoints and departure points. As used herein, a "waypoint" may refer to any identified reference point that the UAV 102 is moving towards on a current trajectory. In one or more implementations, the flight control system 104 may determine a desired trajectory of the UAV 102 based exclusively on a number of waypoints. Alternatively, as used herein a "departure point" may refer to a reference point from which the UAV 102 is moving away. For example, a waypoint may become a departure point at a moment when a distance between the reference point and the UAV 102 is becoming larger rather than smaller. In one or more embodiments, the reference point manager 108 may update a plurality of reference points based on a waypoint becoming a departure point, as will be discussed in further detail below. As noted above, the desired path may be defined by any number of reference points, including any number of departure points or waypoints as may fit a particular use-case (e.g., a specific flight route).

As further shown, the flight controller system 104 includes a trajectory manager 110. In one or more implementations, the trajectory manager 110 determines whether the UAV 102 should pursue a modified and flyable flight path relative to a current flight path based on a position of the identified reference points relative to a position (and direction) of the UAV 102. For example, in one or more implementations, the trajectory manager 110 calculates a modified and flyable flight path based on locations of the reference points relative to the current location of the UAV.

For example, and as will be discussed in further detail below, in determining the modified and flyable flight path, the trajectory manager 110 can determine one or more reference angles of the reference points. More specifically, the trajectory manager 110 can determine reference angles between a current trajectory of the UAV 104 and a line extending from the UAV 104 to the reference points. The trajectory manager 110 can a reference angle for each of the identified reference points. As will be discussed below, the reference angles may be negative, positive, or zero (e.g., where a current trajectory intersects a given reference point). Further, multiple reference points with different reference angles may allow the UAV to anticipate required future maneuvers while at the same time avoiding significant overshoot or undershoot.

The trajectory manager 110 may utilize the reference angles to determine a composite trajectory based on a combination of the reference angles. For example, the trajectory manager 110 can determine an average of each of the reference angles to determine a composite trajectory that the UAV 102 should follow. In one or more embodiments, the trajectory manager 110 identifies the composite trajectory based on the average of reference angles for the plurality of reference points.

In one or more implementations, the trajectory manager 110 determines a weighted average of the reference angles to calculate a composite trajectory. For instance, in one or more embodiments, the trajectory manager 110 applies different weights to different reference points in determining reference angles based on a position of the reference points relative to a current position and/or trajectory of the UAV 102.

For example, in determining the composite trajectory, the trajectory manager 110 may apply different weights to reference angles based on a relative difference of the reference angles to the current trajectory of the UAV 104. In one or more embodiments, the trajectory manager 110 may apply a highest weight to the largest reference angle (e.g., the reference angle having the highest absolute difference from the current trajectory) and a lowest weight to the smallest reference angle (e.g., the reference angle having the lowest absolute difference from the current trajectory). Indeed, the trajectory manager 110 can apply different weights to each of the reference angles based on an absolute difference (e.g., difference from zero degrees) relative to the current trajectory of the UAV 102.

In one or more embodiments, the trajectory manager 110 applies a navigation model to various data to determine the composite trajectory. For example, in one or more embodiments, the trajectory manager 110 applies an algorithm or model that is tuned or otherwise trained to determine a composite trajectory based on inputs including a plurality of reference points, a current trajectory, a velocity of the UAV 102, a number of reference points, and/or a physical position of the reference points relative to a current position of the UAV 102. Additional detail in connection with an example navigation model is discussed below.

As shown in FIG. 1, the flight control system 104 may further include an acceleration manager 112. In particular, upon determining the composite trajectory for the UAV 102, the acceleration manager 112 may determine an acceleration metric (e.g., a guidance command or acceleration comment) for the UAV 102 that enables the UAV 102 to transition between a current trajectory and the composite trajectory based on the reference points.

For example, in one or more embodiments, the acceleration manager 112 determines a side acceleration metric (e.g., a guidance command or acceleration command) for the UAV 102 based on a combination of factors. For instance, the acceleration manager 112 can determine a side acceleration to apply based on an angle between the current trajectory and the composite trajectory. In addition, the acceleration manager 112 can determine a side acceleration based on a current velocity or speed of the UAV 102. The acceleration manager 112 may further determine an acceleration metric based on specifications and capabilities of the UAV 102 in connection with causing the UAV 102 to turn or otherwise change a lateral direction relative to a current trajectory. Additional detail in connection with determining an acceleration metric will be discussed below.

As further shown, the fight control system 104 includes a data storage 114. The data storage 114 may include flight data. The flight data may include any information about a flight of the UAV 102. For instance, flight data may include an identified or desired flight path for the UAV 102. The flight data may include a location of any of the reference points (e.g., waypoints and/or departure points). The flight data may include a speed or velocity of the UAV 102. The flight data may include an origin and/or destination of a flight. The flight data may include a current trajectory of the UAV 102. In one or more implementations, the flight data additionally includes information about respective guidance or acceleration commands. For instance, the flight data may include data about a UAV sideslip angle. To achieve coordinated turns, the sideslip angle may be continuously commanded to be zero.

As further shown, the data storage 114 may include navigation model data. The navigation model data may include any data associated with algorithms, models (e.g., trained models, such as machine learning models and other models that utilize artificial intelligence), and/or parameters that may be used by any component of the flight control system 104 to perform features and functionalities described herein. For instance, the navigation model data may include one or more models for identifying a flight path and/or identifying reference points. The navigation model data may further include model(s) for determining reference angles and composite trajectories for a UAV 102. The navigation model data may further include model(s) for determining and actuating a side acceleration of the UAV 102 based on a difference between a current trajectory and a composite trajectory.

As just mentioned, the navigation model data may include a number of models and algorithms for use by various components 106-114 of the flight control system 104 in performing features and functionality described herein.

As a first example, while one or more examples described herein relate to a set or fixed number of reference points (e.g., three reference points or a specific range of reference points), in one or more implementations, the reference point manager 108 applies a model for determining a number of reference points. For instance, while the reference point manager 108 may utilize any number of reference points, in one or more implementations, the reference point manager 108 determines an optimized number of reference points (N) associated with a smooth transition between two portions of a desired flight path using the following algorithm:

$$N = \frac{L_{max} - L_{min}}{\frac{|V|}{f}}$$

where $L_{max}$ and $L_{min}$ refer to defined parameters of maximum and minimum look ahead distances along a flight path (e.g., over the horizon), V refers to aircraft velocity, and f refers to an update rate of the reference points. Thus, in one or more implementations described herein, the number of reference points may be a function of velocity, frequency of reference point updating, and lookahead distances between the reference points.

As another example, and as mentioned above, the flight navigation model data may include one or more models and algorithms for determining a composite trajectory (or combined angle relative to a current trajectory) based on metrics and factors discussed herein. For instance, in one or more embodiments, the trajectory manager 110 may determine a composite trajectory using the following algorithm:

$$L_{adaptive} = \frac{\sum_{1}^{N} L_N (\cos\Lambda)^2}{N}$$

where $L_{adaptive}$ refers to an adaptive vector (e.g., the composite trajectory), N refers to a number of reference points, $L_N$ refers to a vector for a corresponding reference point, and $\Lambda$ refers to a reference angle.

As a further example, the navigation model data may include one or more models and algorithms for determining an acceleration metric to apply in causing the UAV 102 to transition from a current trajectory to a new trajectory (e.g., the composite trajectory) based on the combination of the reference angles for the identified plurality of reference points. For instance, in one or more implementations, the acceleration manager 112 may determine an acceleration command ($a_{cmd}$) using the following algorithm:

$$a_{cmd} = 2 \frac{|V|^2}{L_{adaptive}} \sin(\eta)$$

where V refers to aircraft velocity, $L_{adaptive}$ refers to an adaptive vector determined using the trajectory manager 110, and η refers to an angle that the aircraft velocity vector makes with the $L_1$ look ahead line.

Due to the adaptive weighting of $L_{adaptive}$, the mean of $a_{cmd}$ may be weighted as well. In one or more implementations, $\phi_{cmd}$ can be found using the following with a mean adaptive $a_{cmd}$. For instance, $\phi_{cmd}$ can be found using the following algorithm:

$$\phi_{cmd} = \operatorname{atan}\left(\frac{\sum_{1}^{N} a_{cmd}}{gN}\right)$$

it is noted that due to the $L_N$ vector's multiple reference points, there are never any jumps in $\phi_{cmd}$, producing a result closer to a curved path rather than an angular turn.

Indeed, in one or more embodiments, the acceleration manager 112 may use different algorithms or models depending on a measure of the angle between a current trajectory and a composite trajectory. For example, in one or more implementations, the flight control system 104 is tuned based on turns having approximately 90 degree angles. While this tuned model generally works well for most angles, it will be understood that the flight control system 104 may fine tune specific acceleration commands based on other calculated angles relative to a current trajectory of the UAV 102. In this way, the flight control system 104 may implement different acceleration commands depending on a severity of angles on a flight path.

Additional detail will now be given in connection with an example implementation of the flight control system 104 in accordance with one or more embodiments. In particular, FIGS. 2A-2E illustrate an example path that a UAV may take in accordance with features of the flight control system 104 discussed above in connection with FIG. 1. For example, FIGS. 2A-2E illustrate example flight paths 200a-e that a UAV 202 may take in accordance with one or more embodiments described above. The UAV 202 shown in FIGS. 2A-2E may be an example of the UAV 102 discussed above. For example, the UAV 202 may include components of the flight control system 104 implemented thereon.

Figure 2A:
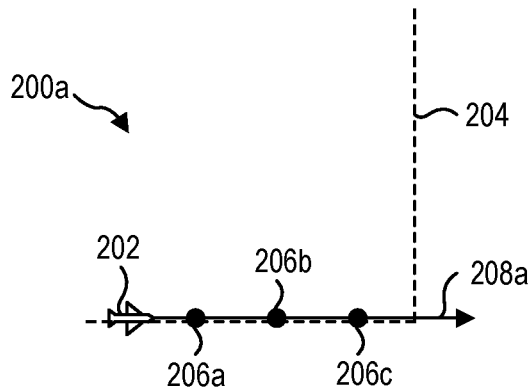
FIGS. 2A-2E illustrate an example trajectory of a UAV relative to a plurality of reference points in accordance with one or more embodiments.

In particular, FIG. 2A illustrates a first flight path 200a. In this example, the UAV 202 is attempting to follow a desired path 204 with an upcoming sharp left turn of ninety degrees. As shown in FIG. 2A, the flight control system 104 can identify a first reference point 206a, a second reference point 206b, and a third reference point 206c. The flight control system 104 may identify additional reference points in other examples; however, for ease in explanation, this implementation may involve identifying three reference points positioned at uniform distances along the desired flight path 204.

As shown in FIG. 2A, a current trajectory 208a of the UAV 202 passes through each of the reference points 206a-c. In this instance of the flight path 200a, the current trajectory 208a of the UAV 202 is following the desired path 204 resulting in zero degree angle differences between the current trajectory 208a and lines between a current position of the UAV 202 and each of the first three reference points 206a-c.

Figure 2B:
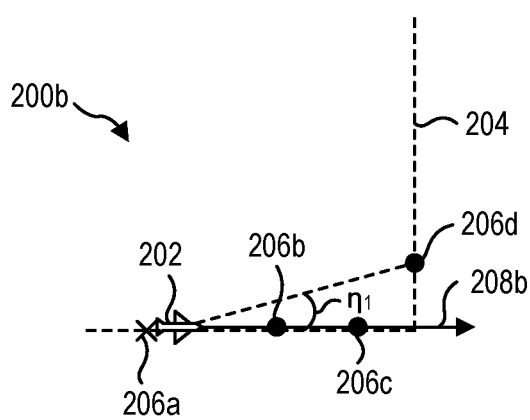

Moving on, FIG. 2B illustrates a second flight path 200b after the UAV 202 has traveled along the desired path 204 for a short period of time. In this example, the UAV 202 has passed the first reference point 206a and is moving away from the first reference point 206a. As mentioned above, in response to the UAV 202 transitioning from moving towards (e.g., moving closer to) the first reference point 206a to moving away from the first reference point 206b, the flight control system 104 may update the reference points to include a fourth reference point 206d. In particular, based on the first reference point 206a becoming a departure point, the flight control system 104 may update a plurality of relevant reference points to include the second reference point 206b, the third reference point 206c, and a fourth reference point 206d.

As shown in FIG. 2B, the fourth reference point 206d may be located on a second section of the desired path 204, indicating that a turn or change in lateral direction of the UAV 202 is coming up in order to remain on the desired path 204. As a result, while the current trajectory 208b of the second flight path 200b may intersect the second reference point 206b and the third reference point 206c, the flight control system 104 may identify a non-zero reference angle between the current trajectory 208b and the fourth reference point 206d.

In accordance with one or more embodiments described above, the flight control system 104 can determine plurality of reference angles for the updated set of identified reference points 206b-d. In particular, in the example of the second flight path 200b, the flight control system 104 can identify zero degree reference angles for the second reference point 206b and the third reference point 206c and a non-zero reference angle ($\eta_1$) for the fourth reference point 206d. Accordingly, the three relevant reference angles may include reference angles of zero, zero, and $\eta_1$, as shown in FIG. 2B.

The flight control system 104 may determine a composite trajectory or a composite angle relative to the current trajectory 208b based on a combination of the three identifier reference angles. For example, the flight control system 104 may determine an average of the three identified reference angles. In one or more implementations, the flight control system 104 applies a heavier weight to the third reference angle ($\eta_1$) based on the non-zero reference angle ($\eta_1$) having a higher absolute difference from the current trajectory 208b then the first two reference angles (each having a zero degree difference from the current trajectory 208b).

Figure 2C:
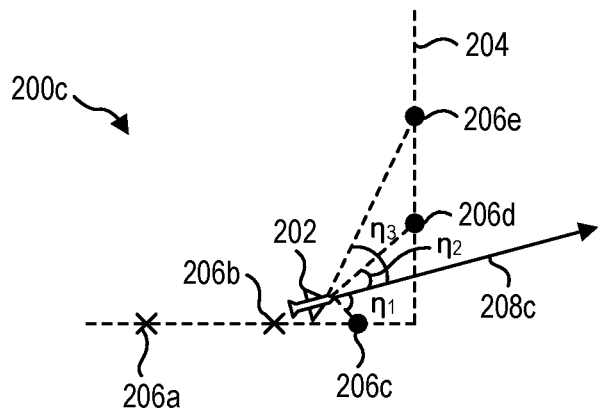

FIG. 2C illustrates a third flight path 200c based on the composite trajectory determines based on the reference angles 206b-d discussed in FIG. 2B. In particular, as shown in FIG. 2C, the flight control system 104 may cause the UAV 202 to modify a trajectory to an updated current trajectory 208c that is no longer parallel to the first portion of the desired path. Accordingly, as shown in FIG. 2C, the UAV 202 may begin turning left in anticipation of the left turn based on the position of the fourth reference angle 206d.

As shown in FIG. 2C, the UAV 202 may continue flying and pass the second reference point. Similar to the description of FIG. 2B, the flight control system 104 can update the plurality of reference points to include the third reference point 206c, the fourth reference point 206d, and a fifth reference point 206e. As shown in FIG. 2C, the fifth reference point may be similarly on the second portion of the desired path 204 further indicating the upcoming left turn of the desired path 204.

Based on the updated reference points, the flight control system 104 can determine reference angles corresponding to the updated reference points 206c-e. In particular, as shown in FIG. 2C, the flight control system 104 can identify a first reference angle ($\eta_1$) corresponding to the third reference point 206c, a second reference angle ($\eta_2$) corresponding to the fourth reference point 206d, and a third reference angle ($\omega$) corresponding to the fifth reference point 206e. As shown in FIG. 2C, the first reference angle ($\eta_1$) may have a negative angle relative to the updated current trajectory 208c while the second reference angle ($\eta_2$) and the third reference angle ($\eta_3$) have positive angles relative to the updated current trajectory 208c.

Similar to the example discussed above in connection with FIG. 2B, the flight control system 104 can determine a composite trajectory based on a combination of the reference angles. In particular, the flight control system 104 may determine a composite trajectory based on a weighted average of the reference angles. For instance, because the third reference angle ($\eta_3$) has the highest absolute difference from the updated current trajectory 208c, the flight control system 104 may apply a highest weight to the third reference angle ($\eta_3$) when determining a composite trajectory for the UAV 202 to follow. Further, in one or more embodiments, the flight control system 104 may apply a lower weight to the first reference angle ($\eta_1$) based on a lower absolute angle difference relative to the updated current trajectory 208c and/or based on a distance between the UAV 202 and the third reference point 206c. Similarly, the flight control system 104 may apply a lower weight to the second reference angle ($\eta_2$) based on a smaller absolute angle difference relative to the updated current trajectory 208c.

Figure 2D:
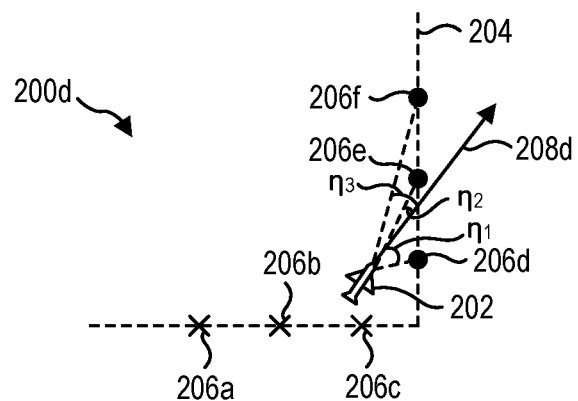

FIG. 2D illustrates another example flight path 200d showing a current trajectory 208d of the UAV 202 based on the flight control system 104 causing the UAV 202 to accelerate and turn based on the composite trajectory determined in connection with FIG. 2C. In this example, the flight control system 104 has similarly updated the plurality of reference points to include the fourth reference point 206d, the fifth reference point 206e, and a sixth reference point 206f.

While FIG. 2D does not indicate each of the reference angles as shown in FIG. 2C, the flight control system 104 can similarly identify reference angles for each of the current set of reference points 206d-f. The flight control system 104 can additionally determine a composite trajectory based on a difference between an updated current trajectory 208d of the UAV 202 and lines extending between the UAV 202 and the updated set of reference points 206d-f. In this example, the current trajectory may indicate a modified path that causes the UAV 202 to continue turning until parallel with the second portion of the desired path 204.

Figure 2E:
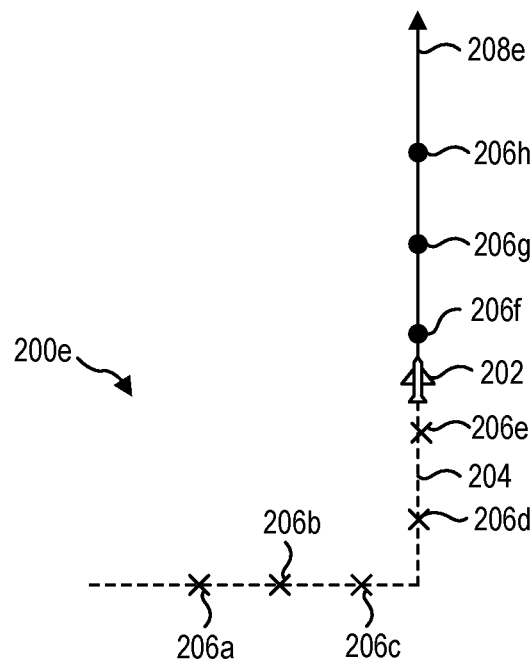

FIG. 2E illustrates another example flight path 200e showing a current trajectory 208e of the UAV 202 after the UAV 202 has completed a full turn between the first portion of the desired path 204 and the second portion of the desired path 204. In particular, the UAV 202 may have turned and continued traveling until each of the first five reference points 206a-e are moving away from the UAV 202 and have become departure points. As further shown, the flight control system 104 may identify an updated set of reference points including a sixth reference point 206f, a seventh reference point 206g, and an eighth reference point 206h.

Similar to one or more examples discussed above, the flight control system 104 can similarly determine reference angles for each of the reference points 206f-h and determine a composite trajectory based on a combination of the reference angles. In this example, because the UAV 202 has fully turned and a current trajectory 208e of the UAV 202 passes through each of the reference points 206f-h (resulting in reference angles having zero or near-zero values), the flight control system 104 may determine that the composite trajectory matches the current trajectory 208e and continue flying on a current path until an updated reference point indicates an upcoming turn.

Figure 3A:
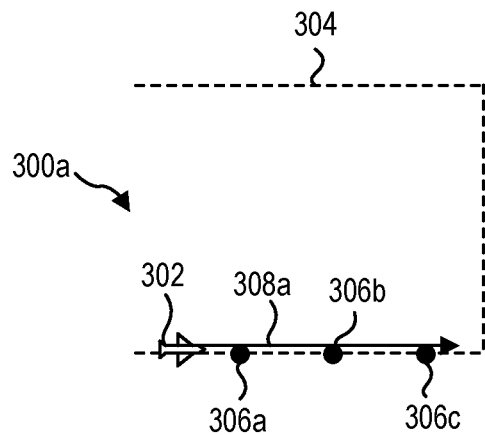
FIGS. 3A-3C illustrate another example trajectory of a UAV relative to a plurality of reference points in accordance with one or more embodiments.
Figure 3B:
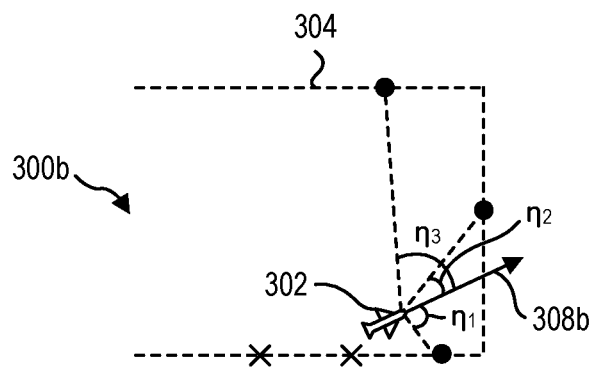
Figure 3C:
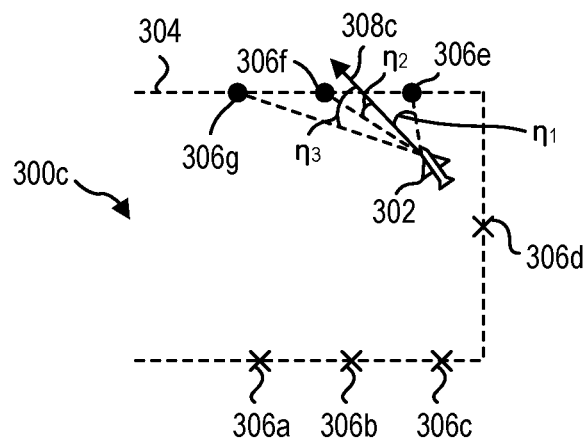

FIGS. 3A-3C illustrate another example implementation of example flight paths 300a-c showing example trajectories of a UAV having a flight control system 104 implemented thereon in accordance with one or more embodiments. For example, FIG. 3A illustrates a first flight path 300a showing a UAV 302 traveling along a desired flight path 304. Similar to the example discussed above in connection with FIG. 2A, the flight control system 104 can identify three reference points 306a-c along a first portion of the desired path 304.

Similar to other example discussed above, the flight control system 104 can compare a current trajectory 308a to the reference points 306a-c to determine whether the UAV 302 should change a lateral direction from the current trajectory 308a. In this example the current trajectory 308a may intersect each of the set of reference points 306a-c such that reference angles for the reference points 306a-c have a zero angle value. As a result, the flight control system 104 may determine that the current trajectory 308a should remain unchanged and continue causing the UAV 302 to fly in a straight line.

FIG. 3B shows an example flight path 300b after the UAV 302 has passed the first two reference points 306a-b and identified an updated set of reference points including a third reference point 306c, a fourth reference point 306d, and a fifth reference point 306e. As shown in FIG. 3B, the updated set of reference points 306c-e may indicate two subsequent sharp turns over which the UAV 302 is expected to perform a 180 degree turn relative to the initial trajectory 308a of the UAV 302 shown in FIG. 3A.

Notwithstanding the reference points being positioned on three different sections of the desired path 304, the flight control system 104 may implement similar features discussed above in connection with FIGS. 1-2E to cause the UAV 302 to perform a smooth turn that follows the desired path 304. In particular, as shown in FIG. 3B, the flight control system 104 can identify a first reference angle (ii') for the third reference point 306c, a second reference angle (m) for the fourth reference point 306d, and a third reference angle (m) for the fifth reference point 306e. Each of the reference angles may refer to a difference in angle between an updated current trajectory 308b of the UAV 302 on the second flight path 300b and lines extending from the UAV 302 to each of the updated set of reference points 306c-e.

In accordance with other examples described herein, the flight control system 104 can determine a composite trajectory based on a combination of the reference angles. In particular, the flight control system 104 may determine a composite trajectory based on a weighted average of the angles in which the larger angles and/or angles corresponding to reference points that are more distant from a current position of the UAV 302 are weighted more heavily than other reference angles associated with other reference points.

FIG. 3C illustrates a further example flight path 300c showing a UAV 302 moving along an updated current trajectory 308c. In this example, the flight control system 104 has identified an updated set of reference points including a fifth reference point 306e, a sixth reference point 306f, and a seventh reference point 306g. Similar to other examples, the flight control system 104 can determine or otherwise identify reference angles for each of the reference points 306e-g and determine a composite trajectory based on a difference between the reference angles and the current trajectory 308c of the UAV 302.

It will be understood that the illustrations shown in FIGS. 2A-2E and FIGS. 3A-3C are provided by way of example only and are not intended to be limiting to specific paths or trajectories that the flight control system 104 is configured to determine. Indeed, each of these examples may refer to turns or combinations of turns that may be included in any identified path between an origin and a destination that the flight control system 104 is equipped to cause a UAV to navigate. Further, while these examples show example turns including ninety degree angles, the flight control system 104 may implement similar features and models to similarly navigate flight paths having larger angles (e.g., larger than ninety degrees) as well as shallow angles (e.g., smaller than ninety degrees).

Additional detail will now be given in connection to example test results in which a flight control system 104 on a UAV was implemented in accordance with one or more embodiments. More specifically, FIGS. 4A-4C illustrate example results in which a UAV navigated a rectangular path using conventional methods we well as using the multi-point (e.g., multiple reference point) navigation techniques described herein.

Figure 4A:
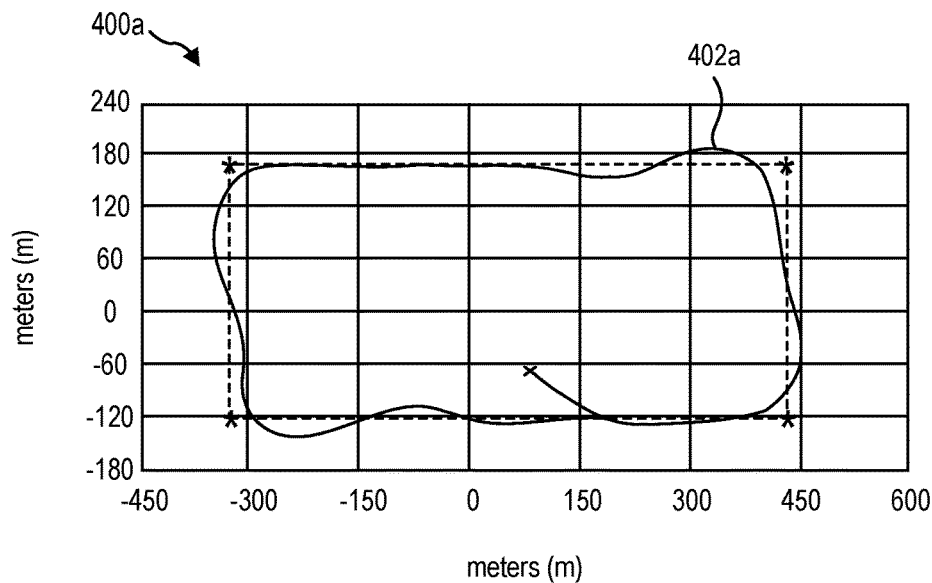
FIGS. 4A-4C illustrate example trajectories of UAVs along desired paths based on different flight navigation approaches.

In particular, FIG. 4A illustrates an example graph 400a showing a flight path 402a of a UAV based on a single reference point (e.g., at a fixed distance on the flight path 402a). For example, this example graph 400a shows an example in which a UAV accelerates toward a single reference point at a time on a previously known map. As can be seen on the illustrated graph 400a, while the UAV anticipated the turns to a degree, the UAV nonetheless overshot the desired path 402a at each of the corners resulting in some inaccuracy of the UAV, particularly where the desired path 402a included sharp corners.

Figure 4B:
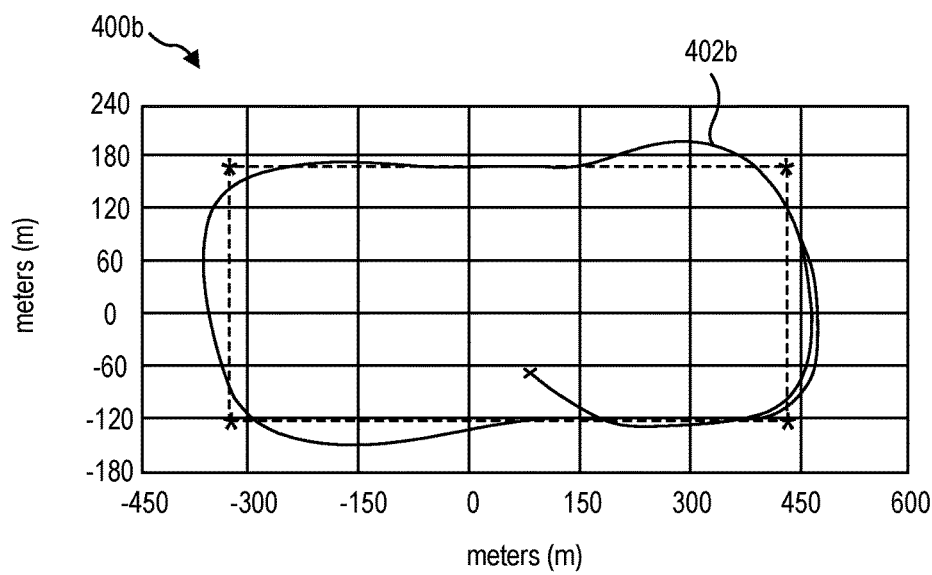

FIG. 4B illustrates an example graph 400b showing a flight path 402b of a UAV based on a linear quadratic regular (LQR) guidance algorithm. For example, this graph 400b shows an example in which a UAV identifies a line between the UAV and a point on the flight path 402b where the line is orthogonal to the flight path 402b. Rather than determining an updated trajectory for the UAV based on reference angles, the UAV instead attempts to minimize the distance between the UAV and the desired path. As shown in FIG. 4B, this LQR guidance technique similar results in inaccuracies when attempting to take sharp turns. Indeed, as shown in FIG. 4B, the UAV overshot the desired path 402b at each of the corners.

Figure 4C:
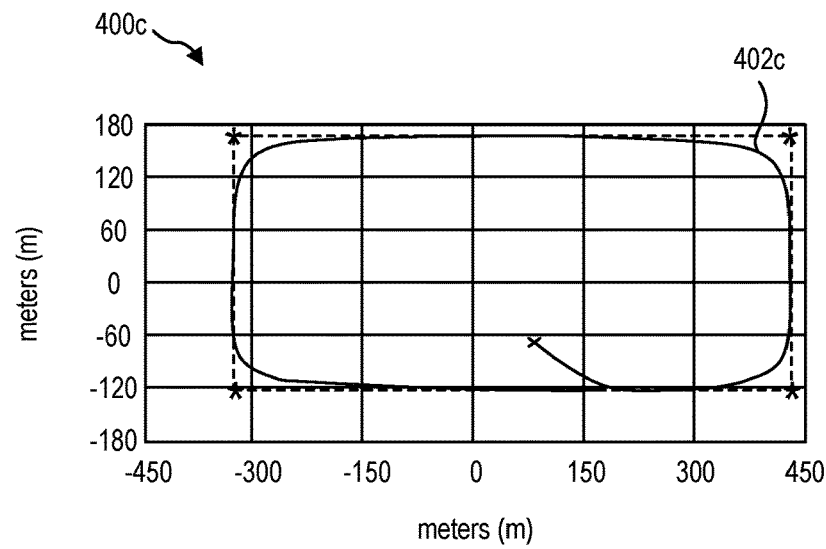

FIG. 4C illustrate an example graph 400c showing a flight path 402c of a UAV having the flight control system 104 implemented thereon in accordance with one or more embodiments described herein. In particular, FIG. 4C shows example results in which the flight control system 104 identified multiple reference points, determined a composite trajectory based on reference angles, and caused a UAV to follow the example flight path 402c shown in FIG. 4C. As can be seen, the UAV is able to anticipate sharp turns and the UAV does not overshoot the desired path 402c of the UAV. Moreover, this can be performed without requiring that the UAV having access to the entire flight path 402c prior to departure.

Figure 5:
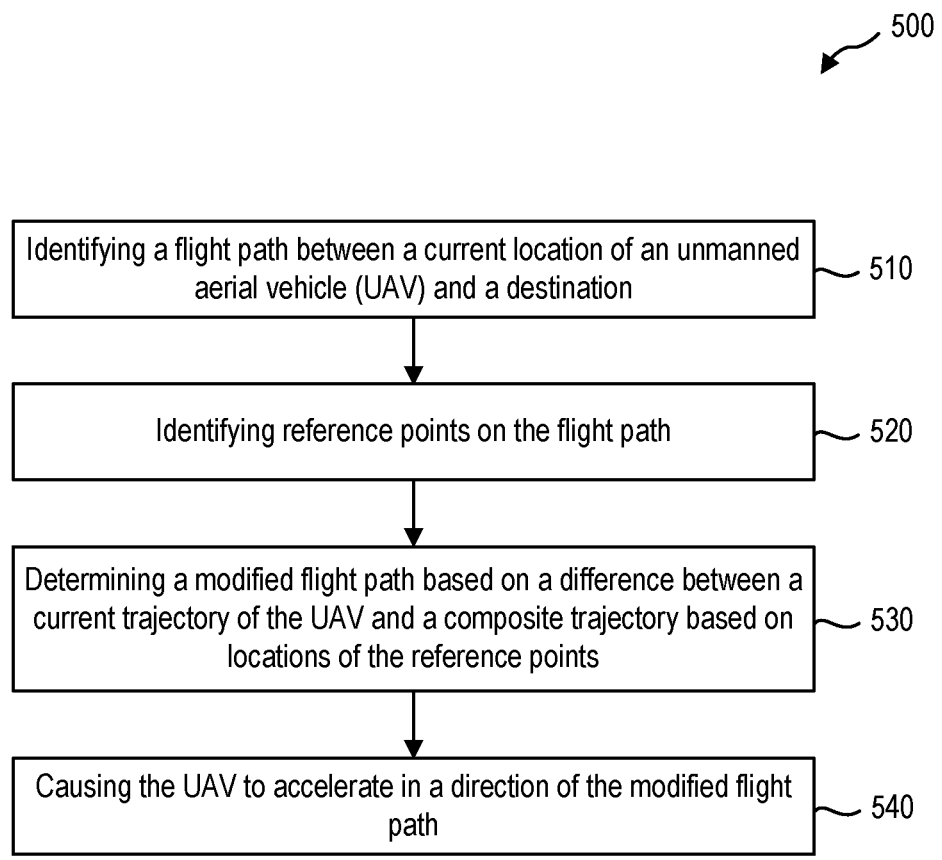
FIG. 5 illustrates an example series of acts for controlling a flight path of a UAV based on a plurality of reference points in accordance with one or more embodiments.

Turning now to FIG. 5, this figure illustrates an example flowchart including a series of acts for causing a UAV to follow a flight path based on a position of a plurality of reference points relative to a current trajectory of the UAV. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can comprise instructions that, when executed by one or more processors, cause a computing device (e.g., input device, gaming console, client device) to perform the acts of FIG. 5. In still further embodiments, a system can perform the acts of FIG. 5.

FIG. 5 shows a series of acts 500 for causing a UAV to follow a flight path in accordance with one or more embodiments described herein. As shown in FIG. 5, the series of acts 500 includes an act 510 of identifying a flight path between a current location of an unmanned aerial vehicle (UAV) and a destination. For example, in one or more implementations, the act 510 involves identifying a flight path between a current location of an unmanned aerial vehicle (UAV) and a destination where the flight path correspond to a desired path of movement of the UAV.

In one or more implementations, identifying the flight path includes receiving a transmission package including the flight path from a remote computing device. In one or more embodiments, identifying the flight path comprises adaptively determining the flight path based on the current location of the UAV and a target destination. Further, in one or more implementations, the path of movement includes a sharp turn, the sharp turn having an angle greater than or equal to ninety degrees. In addition, the path of movement may include two or more sharp turns having angles greater than or equal to ninety degrees.

As further shown, the series of acts 500 includes an act 520 of identifying reference points on the flight path. For example, in one or more implementations, the act 520 involves identifying a plurality of reference points on the flight path. In one or more implementations, identifying the plurality of reference points includes identifying reference points at predetermined distances from adjacent reference points, the predetermined distances being determined based on a velocity of the UAV. Further, in one or more implementations, identifying the plurality of reference points includes identifying a range of three to one hundred reference points along the desired path of movement of the UAV.

As further shown, the series of acts 500 includes an act 530 of determining a modified (and flyable) flight path based on a difference between a current trajectory of the UAV and a composite trajectory based on locations of the reference points. For instance, in one or more implementations, the act 530 involves determining a modified and flyable flight path based on a difference between a current trajectory of the UAV and a composite trajectory based on locations of the plurality of reference points relative to the current location of the UAV.

In one or more embodiments, determining the modified and flyable flight path includes determining a plurality of reference angles between the current trajectory of the UAV and respective paths from the UAV to the plurality of reference points. This may include determining a reference angle for each reference point. Further, determining the modified and flyable path may include determining the composite trajectory based on a combination of reference angles for the plurality of reference points. In one or more implementations, determining the composite director is based on a weighted average of the plurality of reference angles. Further, determining the weighted average may include adaptively applying a highest weight factor of a plurality of weight factors to a largest reference angle from the plurality of reference angles.

As further shown, the series of acts 500 includes an act 540 of causing the UAV to accelerate in a direction of the modified flight path. For example, in one or more implementations, the act 540 involves causing the UAV to accelerate in a direction of the modified and flyable flight path. In one or more implementations, causing the UAV to accelerate in the direction of the modified and flyable flight path includes initiating a side acceleration of the UAV based on a function of the difference between the current trajectory and the composite trajectory.

In one or more implementations, the series of acts 500 includes detecting that the UAV is moving away from a first reference point of the plurality of reference points. Based on the UAV moving away from the first reference point, the series of acts 500 may include updating the plurality of reference points by replacing the first reference point with a new reference point on the flight path. In one or more implementations, the series of acts 500 further includes determining an updated flight path based on the updated plurality of reference points and causing the UAV to accelerate in a direction of the updated flight path.

Figure 6:
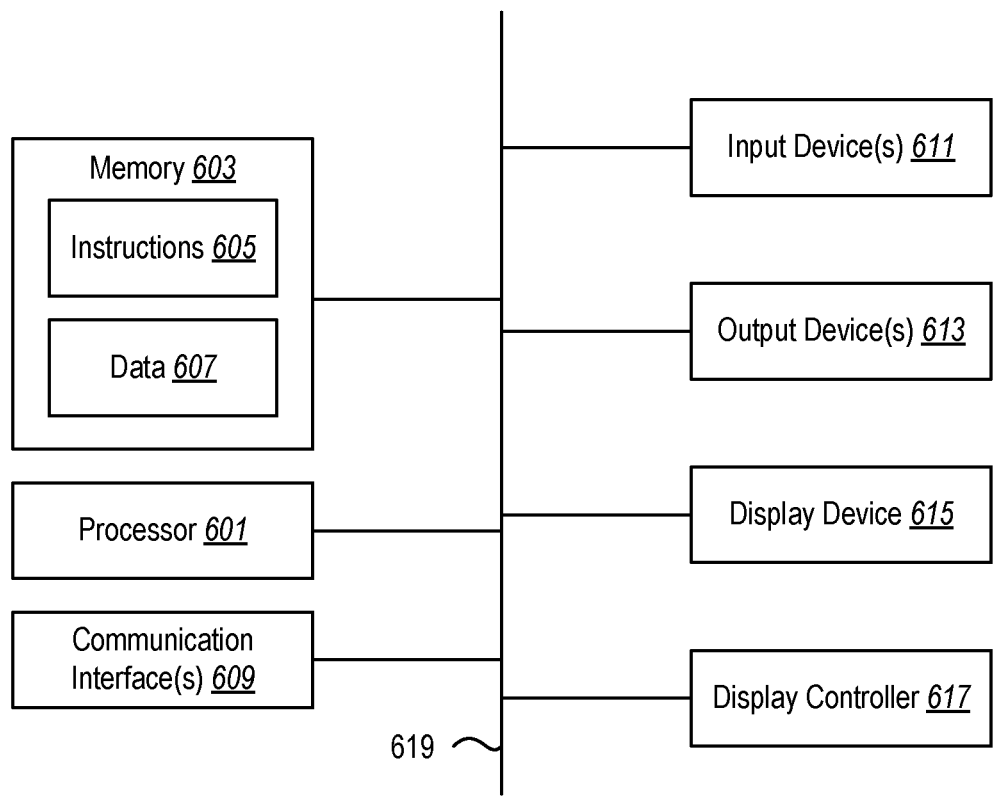
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

In one or more implementations, the computer system 600 may additionally include avionics components. By way of example and not limitation, these may include a global positioning system (GPS) unit, an internal measurement unit (IMU), an extended or ensemble Kalman Filter (EKF), and pressure sensors.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    identifying a flight path between a location of an unmanned aerial vehicle (UAV) and a destination, the flight path corresponding to a desired path of movement of the UAV; and
    after the UAV embarks on the flight path:
        identifying a next portion of the flight path
        identifying a plurality of reference points defining the next portion;
        determining a composite trajectory for the UAV to follow based on a plurality of reference angles between the plurality of reference points and a current trajectory of the UAV; and
        causing the UAV to accelerate in a direction of the composite trajectory to transition to the next portion of the flight path.

2. The method of claim 1, wherein the plurality of reference points includes a quantity of reference points based on a current velocity of the UAV.

3. The method of claim 1, wherein causing the UAV to accelerate in the direction of the composite trajectory comprises initiating a side acceleration of the UAV based on a function of the difference between the current trajectory and the composite trajectory.

4. The method of claim 1, wherein the composite trajectory directs the UAV to not pass through one or more reference points of the plurality of reference points.

5. The method of claim 1, wherein the next portion is associated with a turn of the flight path, and wherein the composite trajectory does not direct the UAV directly at any reference point of the plurality of reference points.

6. The method of claim 1, further comprising updating the next portion of the flight path to determine a consecutive, updated next portion of the flight path, wherein updating the next portion includes updating the plurality of reference points to determine an updated plurality of reference points defining the updated next portion.

7. The method of claim 6, wherein updating the plurality of reference points includes identifying and including in the updated plurality of reference points at least one additional reference point on the flight path for defining the updated next portion.

8. The method of claim 6, wherein updating the plurality of reference points includes identifying and removing from the plurality of reference points at least one reference point on the flight path that does not correspond to the updated next portion.

9. The method of claim 1, wherein a distance between adjacent reference points of the plurality of reference points is based on a current velocity of the UAV.

10. The method of claim 1, wherein the next portion a sharp turn having and angle greater than or equal to ninety degrees.

11. The method of claim 1, wherein determining the composite trajectory is based on a weighted average of the plurality of reference angles.

12. The method of claim 11, wherein determining the weighted average includes adaptively applying a highest weight factor of a plurality of weight factors to a largest reference angle from the plurality of reference angles.

13. An unmanned aerial vehicle (UAV) system, comprising:
    a UAV; and
    a flight control system comprising:
        one or more processors;
        a memory in electronic communication with the one or more processors; and
        instructions stored in the memory, the instructions being executable by the one or more processors to:
            identify a flight path between a location of the UAV and a destination, the flight path corresponding to a desired path of movement of the UAV; and
            after the UAV embarks on the flight path;
                identify a next portion of the flight path;
                identify a plurality of reference points defining the next portion of the flight path;
                determine a composite trajectory for the UAV to follow based on a plurality of reference angles between the plurality of reference points and a current trajectory of the UAV; and
                cause the UAV to accelerate in a direction of the composite trajectory to transition to the next portion of the flight path.

14. The system of claim 13, wherein identifying the plurality of reference points comprises identifying reference points at predetermined distances from adjacent reference points, the predetermined distances being determined based on a velocity of the UAV.

15. The system of claim 13, wherein determining the composite trajectory is based on a weighted average of the plurality of reference angles.

16. The system of claim 13, further comprising instructions being executable by the one or more processors to:
    detect that the UAV is moving away from a first reference point of the plurality of reference points;
    based on the UAV moving away from the first reference point, update the plurality of reference points by replacing the first reference point with a new reference point on the flight path;
    determine an updated next portion of the flight path based on the updated plurality of reference points; and
    cause the UAV to accelerate in a direction of the updated next portion of the flight path.

17. A non-transitory computer-readable medium storing instructions thereon that, when executed by one or more processors on an unmanned aerial vehicle (UAV), cause a computing device to:

identify a flight path between a location of the UAV and a destination, the flight path corresponding to a desired path of movement of the UAV; and after the UAV embarks on the flight path;

identify a next portion of the flight path;

identify a plurality of reference points defining the next portion of the flight path;

determine a composite trajectory for the UAV to follow based on a plurality of reference angles between the plurality of reference points and a current trajectory of the UAV; and cause the UAV to accelerate in a direction of the composite trajectory to transition to the next portion of the flight path.

18. The non-transitory computer-readable medium of claim 17, wherein identifying the plurality of reference points comprises identifying reference points at predetermined distances from adjacent reference points, the predetermined distances being determined based on a velocity of the UAV.

19. The non-transitory computer-readable medium of claim 17, wherein determining the composite trajectory is based on a weighted average of the plurality of reference angles.

20. The non-transitory computer-readable medium of claim 17, further comprising instructions thereon that, when executed by the one or more processors on the UAV, cause the computing device to:

detect that the UAV is moving away from a first reference point of the plurality of reference points;

based on the UAV moving away from the first reference point, update the plurality of reference points by replacing the first reference point with a new reference point on the flight path;

determine an updated next portion of the flight path based on the updated plurality of reference points; and cause the UAV to accelerate in a direction of the updated next portion of the flight path.

* * * * *